Patented Nov. 26, 1929

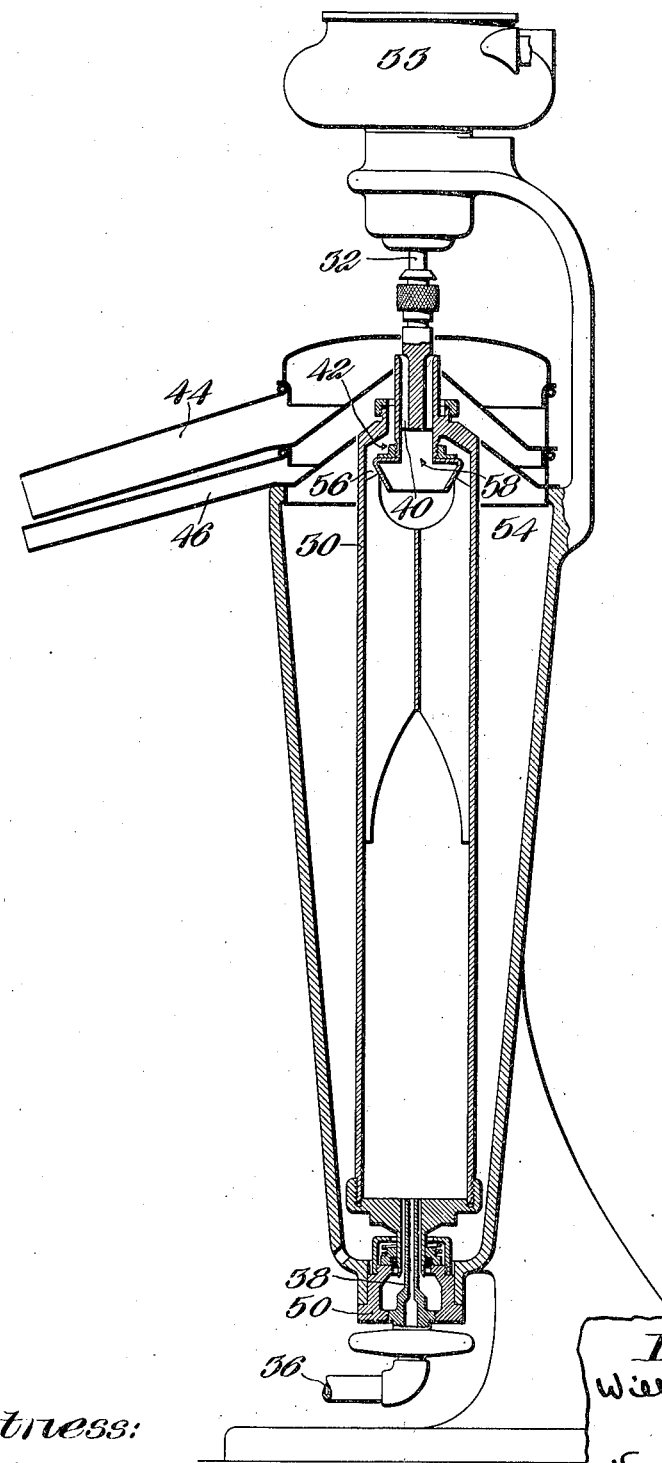

1,737,287

UNITED STATES PATENT OFFICE

WILLIAM BURTON WESCOTT, OF WELLESLEY, MASSACHUSETTS, ASSIGNOR TO AMERICAN PROTEIN CORPORATION, OF BOSTON, MASSACHUSETTS, A CORPORATION OF MASSACHUSETTS

CENTRIFUGE

Original application filed December 5, 1922, Serial No. 605,090. Divided and this application filed June 17, 1925. Serial No. 37,688.

The present invention relates to centrifuges and more particularly to the type of centrifuge disclosed in my copending application Ser. No. 605,090, filed December 5, 1922, of which this application is a division.

The object of the present invention is to provide a centrifuge which will separate constituents of a liquid mixture from one another in an economical and practical manner. To this end the invention consists in the centrifuge hereinafter described and particularly defined in the claims.

The drawing is a vertical sectional elevation of the preferred form of the centrifuge.

The invention is herein illustrated and described as utilized for the separation of the constituents of animal blood which is obtained and collected during the slaughter of animals upon the killing floor. In particular the invention is especially adapted for separating the red corpuscular matter from the plasma proteins of the blood to obtain an edible food product, as disclosed in my copending application above referred to.

The valuable and nutritious properties of the proteins occurring as constituents of animal blood have been recognized for some time by those who have searched for new foods. The very nature of blood has prevented any extensive use of anything resembling blood in color and form. Not only must the food or food bases derived from blood and the methods by which they are produced be of a character such as to pass rigid Government inspection, but also for commercial reasons must the products be sufficiently changed in appearance as to in no way resemble blood. It is desirable in order that their use may extend into the various edible fields, that the products be free from the characteristic odor of meat and of infinitely better keeping qualities than ordinary animal blood. Very small amounts of whole blood are occasionally used in articles of food such as blood pudding, blood sausage and blood bread, but only in foods which are subjected to very thorough sterilization by cooking before use. Up to the present time it has been impossible to collect animal blood and separate its constituent proteins for use as edible products in a practical commercial way. The separated constituent proteins of blood have not heretofore been available, therefore, as foods or food bases.

Products prepared from blood by usual methods are available only for technical or industrial uses and even such products are not wholly satisfactory because of poor keeping qualities, poor color, low solubility, strong odor, and a marked tendency to change their characteristics with age. The bulk of the slaughterhouse blood produced today is converted into a dry product to be used as fertilizer. In addition to the quantity of slaughterhouse blood which is utilized for fertilizer a relatively small amount of such blood is used for the production of blood sera, commonly known upon the market as blood albumins. These products find use in the textile and leather industries as well as for the production of waterproof veneers. According to usual methods for their production the desired quantity of blood is collected in pails or otherwise in a more or less careless manner during the slaughter of the animal and while the blood is gushing down upon the killing floor. The blood thus collected is permitted to clot in a large shallow vessel, the clot is thereafter cut into small cubes by means of a coarse wire net and the cubes then spread upon a fine wire net to drain. The serum yielded by the contraction of the fibrin in the small cubes is colored red by the free hemoglobin resulting from both the mechanical rupture of the corpuscles during the severance of the clot and also by hemolysis caused by the introduction of extraneous moisture during the collection of the blood. The color of such sera produced by this general method has been slightly improved by collecting the sera from the drainage operation in steps, the first run yielding a deep red product and the second run a product of a lighter red color. These products are oftentimes then passed through a centrifuge in order to clarify them, but because of the manner in which the blood is collected it is contaminated with bacteria such as to render the sera unfit for edible purposes and with sufficient moisture from the drippings from the animal to produce by hemolysis a redness in the final serum which is alone sufficient to prevent their use for edible purposes. The action of the centrifuge has no effect upon this free hemoglobin and the red color may only be removed from such sera by an involved chemical process. In addition to this clotting method the blood may be defibrinated, as by stirring. In this process the fibrin clots about the stirrer and may be subsequently separated from the serum. The mechanical action of the stirrer upon the red corpuscles operates to free considerable hemoglobin which, together with the amount of hemoglobin freed by hemolysis due to extraneous moisture introduced into the blood during its collection, serves to impart sufficient redness to the resulting serum as to render it entirely unfit for edible purposes.

In addition to the foregoing, immune sera and similar products are produced in special laboratories by taking small amounts of blood of specially treated animals without permanent injury to the animals. The blood thus obtained is manipulated in small individual lots under conditions which are feasible only in special laboratories and which are entirely impractical from the commercial point of view of producing food products. These sera as found upon the market usually contain additional preservatives to prevent their early decomposition.

According to the method disclosed in the above mentioned copending application each animal after being stunned and hoisted into proper position is cut in such a manner as to obtain its blood without contact with the hide of the animal, whereby contamination due to bacterial infection or hemolysis is eliminated. This operation is conveniently carried out by an improved form of butchering knife of the type disclosed in the application of F. C. Atwood, Ser. No. 605,091, filed December 5, 1922. Blood is conducted through a hollow handle of the knife into suitable cans which contain an amount of anti-coagulant to prevent coagulation of the blood. As described in my parent application the cans are provided with specially designed covers to prevent condensation of moisture and consequent hemolysis of the blood. The blood of each animal is preferably drawn into a separate can which may be conveniently tagged or otherwise designated pending the final inspection of the animal by the inspector, so that in the event that the animal is unfit for food use the can of blood may be rejected without contamination of the blood from other animals.

After the collection of the blood in the containers it is now in condition for further treatment for the production of edible products free from the objectionable red color which has heretofore accompanied the production of albumins from animal blood. The separation of the red corpuscular matter from the clear serum portion is preferably accomplished by the passage of the blood through a centrifuge of the continuous type, the preferred form of which forms the subject matter of the present invention.

The illustrated embodiment of the invention comprises in general an elongated bowl 30 suspended from the end of the shaft 32 adapted to be driven in the usual manner by a turbine 33 at high speed. The blood to be separated is introduced directly from the containers in which it is caught upon the killing floor through a conduit 36 and delivery nozzle 38 to the interior of the bowl 30 at its lower end. The delivery nozzle 38 terminates sufficiently near the lower end of the interior of the bowl 30 as to insure that the entering blood stream passes into the bowl without encountering any portion of the metal of the rotating bowl itself. During the centrifuging operation the red corpuscular matter is thrown to the outside, leaving the light colored solution as an annular layer nearer the center. Both layers are withdrawn from the upper part of the bowl 30 through discharge passages 40, 42 leading into and communicating with discharge nozzles 44, 46 as shown. The separated products are collected in relatively large containers, not shown.

During the operation of the centrifuge, the blood stream is delivered directly into the interior of the bowl 30 at near its lower end. The blood within the bowl 30 assumes a cylindrical shape because of the action of centrifugal force thereon, so that the entering blood stream initially impinges upon a wall of blood as the stream leaves the delivery nozzle. During the continued operation of the centrifuge the entering blood is gradually brought up to the speed of the bowl by contact with the liquid wall of blood between it and the wall of the bowl 30. In practice the blood stream will have traversed upwardly to somewhere near the mid portion of the bowl during the interval that it is being brought up to speed. The interior of the bowl 30 from the delivery nozzle to the point in the bowl 30 where the blood stream attains the speed of the bowl is purposely made devoid of all obstructions. This construction of apparatus, it will be observed, enables the entering blood stream to be brought up to speed solely by means of a liquid cushion and in this manner the smashing of the red corpuscles characteristic of the effect of known centrifuges is entirely avoided.

The problem of completely separating the red corpuscular matter from the clear liquid portion of the blood is rendered particularly difficult because of the ability of a very small quantity of hemoglobin to color such clear liquid portion. In endeavoring to secure a complete separation by means of the centrifuges at present upon the market considerable difficulty was encountered even though all of the above mentioned conditions as to the design of the lower part of the centrifuge bowl were carefully maintained. The cause of the red coloration imparted to the effluent was, after much study and investigation, found to reside in the air currents passing upwardly through the interior of the centrifuge from around the delivery nozzle. These air currents even though relatively small seem to have the effect of carrying a portion or mist of whole blood from the entering blood stream upwardly through the central portion of the centrifuge where it was mixed with the separated clear liquid portion. In addition the passage of the air currents in this manner seemed to operate to induce mixing between the separated portions of blood and to, in this manner, interfere with the desired complete separation. The occurrence of such air streams may be successfully prevented in different ways as, for example, by closing the openings through which such air currents were introduced into the bottom of the bowl around the delivery nozzle, and for this purpose the delivery nozzle 38 and its supporting casing 50 are, in the centrifuge illustrated in the drawing, formed integrally in a manner such that the casing completely seals the space surrounding the delivery nozzle and through which the objectionable air currents were, in the commercial centrifuges, found to pass.

The usual practice in the construction of centrifuges of the type illustrated in the drawing contemplates the provision of vanes 54 affixed to the rotating bowl and which serve to assist in maintaining the blood rotating at the speed of the bowl. As illustrated, the vanes 54 are of gradually increasing width or depth at the lower portion through the provision of lower edge portions curving inwardly from a joint adjacent the periphery of the bowl to the juncture of the vanes. This causes the upwardly moving liquid stream to be gradually engaged and rotated by the vanes without shock or rupture of the red corpuscles. Such vanes at their tops present surfaces favorable for the conduction, by capillarity or surface tension or a similar force, of some of the red corpuscles from the outer portions of the bowl inwardly against centrifugal force into the clear liquid portion which has been completely separated from the red corpuscles. The effect of such traverse or creeping of the red corpuscles along the surfaces at the top of these vanes was to impart sufficient objectionable red coloration to the effluent as to render it unfit for use as a food base. This objectionable feature is overcome in the present instance by the provision of a dam 56 comprising a tapered conical structure arranged to form a tapered passage leading directly to the discharge outlets 46 through which the red corpuscular matter is withdrawn from the centrifuge. The inner portions of the dam terminate at approximately the boundary wall between the clear liquid and the red corpuscular matter in an opening formed by cut-away portions of the vanes themselves. In this manner a very indirect path is afforded for the traverse of the red corpuscles from the upper portion of the bowl near the discharge outlets. The contact of the vanes with the red corpuscular matter is at the top of the vanes limited to a point spaced a considerable distance from the boundary wall of the clear liquid portion. The portion of the dam 53 included in the opening formed by the cut-away portions of the vanes does not seem to exert sufficient action upon the red corpuscular matter to overcome the tremendous centrifugal force tending to throw such matter to the exterior of the bowl and toward the discharge outlets. Any red corpuscles which actually to traverse around the end of the dam find themselves in a secondary chamber 58 immediately upon the dam, in which the centrifugal force operates to throw them to the outside, thus permitting the clear fluid portion to pass out through its discharge nozzle entirely uncontaminated by any red corpuscles. At the end of each day's run the centrifuge is cleaned and whatever red corpuscular matter accumulates in the secondary chamber is removed at this time.

The straw yellow effluent resulting from the centrifuging operation is free from or contains so little hemoglobin as to be entirely devoid of any suggestion of the objectionable red color of blood. This effluent comprises a solution of the plasma proteins of the blood of a plurality of food animals and for this reason succeeding quantities of it produced by the present process are of a high degree of uniformity not only as to color but also as to composition. The ratios of blood sugar and fat to its protein content are very definite and enable the product to be successfully used as a food base. The uniformity of its composition due to the fact that it is derived from the blood of a series of animals as distinguished from the blood of a single isolated animal is a very important distinction from the viewpoint of standardization by the baker or other person using this product or any subsequent products derived therefrom. This plasma solution has a gravity of approximately 4½° Bé. and contains about 9% solids, including small amounts of such salts as chlorides, carbonates, sulphates and phosphates of sodium, potassium, calcium, magnesia and iron. The bacterial content of this product is relatively low, being lower than that of bulk fluid or frozen egg white of the American market. As a consequence of the improved methods of producing this product its stability is exceedingly high. This product finds use as a general food base for all sorts of culinary purposes in which its physical characteristics at high nutritious value may be used with advantage.

While the different features of the invention have been described in their preferred forms, it is to be understood that they may be embodied in other forms within the scope of the following claims.

Having thus described the invention, what is claimed is:

1. A centrifuge for completely separating the red corpuscular matter from animal blood comprising a bowl, means for rotating the bowl at high speed, a delivery nozzle for introducing the blood stream to within the bowl, positioned so as to cause, during the operation of the centrifuge, the entering blood stream to initially impinge upon a slowly rotating wall of blood, the portion of the interior of the centrifuge bowl within which the blood is brought up to speed being entirely devoid of obstructions, a plurality of vanes positioned in the upper portion of the bowl, and a tapered dam located centrally in the upper portion of the bowl and cooperating with the vanes to accomplish a complete separation of the inner and outer portions of the blood stream.

2. A centrifuge for completely separating the red corpuscular matter from animal blood comprising a bowl, means for rotating the bowl at high speed, a delivery nozzle for introducing the blood stream to within the bowl positioned so as to cause, during the operation of the centrifuge, the entering blood stream to initially impinge upon a slowly rotating wall of blood, and a conical dam flaring outwardly from its lower portion and located in the upper portion of the bowl for retarding movement of the red corpuscles from the vicinity of the discharge outlets for the red corpuscular matter toward the central portion of the bowl.

3. A centrifuge for completely separating the red corpuscular matter from animal blood comprising a bowl, means for rotating the bowl at high speed, a delivery nozzle for introducing the blood stream to within the bowl positioned so as to cause, during the operation of the centrifuge, the entering blood stream to initially impinge entirely upon a slowly rotating wall of blood, and a dam in the upper portion of the bowl arranged to prevent the traverse of red corpuscles along the walls of the bowl and toward the interior of the bowl and shaped to form a secondary chamber within which any red corpuscles passing around the dam may accumulate without contaminating the clear separated portion of the blood.

4. A centrifuge for completely separating the red corpuscular matter from animal blood comprising a bowl having vanes located in the upper portion thereof for maintaining the material at the speed of the bowl, the vanes having central cutaway portions forming a central opening at their upper end, and a dam having an outwardly tapered surface for retarding the movement of the red corpuscles along the upper surfaces of the vanes from the walls of the bowl toward the center thereof, said dam having its inner end unsupported and terminating in the opening formed by the central cutaway portions of the vanes.

5. A centrifuge of the class described comprising a bowl having a substantially cylindrical inner surface entirely devoid of obstructions through its lower half, means for rotating the bowl at high speed, a delivery nozzle for introducing liquid into the lower portion of the bowl, a plurality of radial vanes located in the upper portion of the bowl and having inwardly curved lower edges, and a tapered dam positioned centrally in the upper portion of the bowl at the upper edges of the vanes and serving to complete the separation of the inner and outer liquid strata.

6. A centrifuge of the class described comprising a rotating bowl, means for introducing liquid at one end of the bowl, a plurality of vanes mounted within the bowl and removed from the entrance point of the liquid, the vanes at the inlet end having converging edges designed to gradually bring the liquid up to the speed of the bowl and at opposite ends having central cut-away portions to form a space adjacent the discharge end of the bowl, and means for withdrawing the two streams of liquid from the bowl.

WILLIAM BURTON WESCOTT.